(12) United States Patent
Holm et al.

(10) Patent No.: US 8,412,253 B2
(45) Date of Patent: Apr. 2, 2013

(54) PUSH TO TALK OVER CELLULAR (POC) SERVER CAPABLE OF CHANGING SESSION PRIORITY SETTINGS WHEN RECEIVING AUTHORIZED OVERRIDE MESSAGE

(75) Inventors: Jan Holm, Gävle (SE); Jan Dahl, Älvsjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 371 days.

(21) Appl. No.: 12/936,440

(22) PCT Filed: Apr. 8, 2008

(86) PCT No.: PCT/SE2008/050402
§ 371 (c)(1),
(2), (4) Date: Oct. 5, 2010

(87) PCT Pub. No.: WO2009/126073
PCT Pub. Date: Oct. 15, 2009

(65) Prior Publication Data
US 2011/0034203 A1 Feb. 10, 2011

(51) Int. Cl.
*H04Q 7/20* (2006.01)

(52) U.S. Cl. ........ 455/518; 455/519; 455/416; 455/500; 455/517; 455/509; 370/259; 370/261; 370/262; 370/265; 370/329

(58) Field of Classification Search .......... 455/518, 455/519, 416, 500, 517, 509, 508, 512, 515, 455/520, 514, 466, 414.1–414.4, 422.1, 403, 455/445, 550.1, 575.1; 370/259, 262, 265, 370/261, 328, 329, 343, 310
See application file for complete search history.

(56) References Cited

U.S. PATENT DOCUMENTS
2007/0087768 A1* 4/2007 Schmidt et al. ............... 455/518
2012/0289212 A1* 11/2012 Kowalewski ................ 455/416

* cited by examiner

*Primary Examiner* — Keith Ferguson
(74) *Attorney, Agent, or Firm* — Roger S. Burleigh

(57) ABSTRACT

The present invention related to a Push to talk Over Cellular (PoC) Server for providing PoC communication services in communications system, the PoC Server being arranged to simultaneously perform a first PoC Session between a first PoC Client and at least a second PoC Client, and at least one second PoC Session between the first PoC Client and at least a third PoC Client in accordance with a priority setting. The Push to talk Over Cellular (PoC) Server is characterized in that it is further arranged to: receive, from said at least second PoC Client, a first information indicating that a user of said at least second PoC Client wants to alert the user of said first PoC Client about relevant Media being shared in said first PoC Session; or receive, from said at least third PoC Client, a second information indicating that a user of said at least third PoC Client wants to alert the user of said first PoC Client about relevant Media being shared in said at least second PoC Session; and if the received information is a notification, forward said received information to said first PoC Client; or if the received information is an override message, change said priority setting for said first and/or said at least second PoC Sessions associated with said first PoC Client in accordance with said override message. The present invention also relates to a method for providing PoC communication services, a mobile terminal comprising a PoC Client and methods thereof, a communications system and a computer program product.

18 Claims, 8 Drawing Sheets

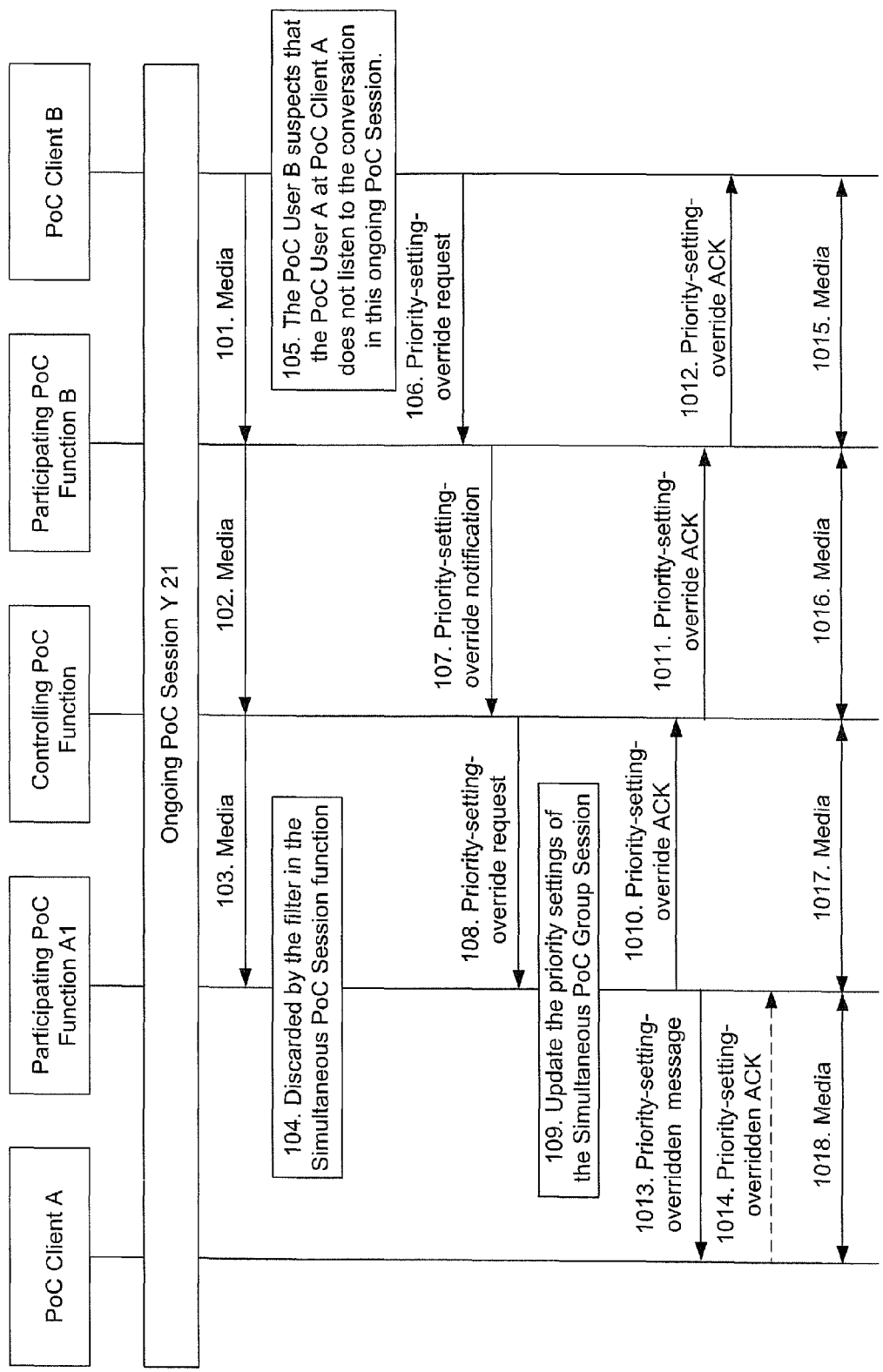

PUSH TO TALK OVER CELLULAR (POC) SERVER CAPABLE OF CHANGING SESSION PRIORITY SETTINGS WHEN RECEIVING AUTHORIZED OVERRIDE MESSAGE

TECHNICAL FIELD

The present invention relates in general to a Push to talk Over Cellular (PoC) Server and terminals for providing PoC communication services in a communications system, and in particular to a Push to talk Over Cellular (PoC) Server and mobile terminals for providing PoC communication services to a PoC User participating in a PoC Session of a PoC communication service in a mobile radio communications system.

BACKGROUND

Many existing mobile radio communications systems today use a core network comprising a IP Multimedia Subsystem (IMS), or other Session Initiated Protocol (SIP) based systems containing the functionality of an IMS system, for offering packet switched services to e.g. users of mobile terminals, IP-based communication terminals or the like.

An example of such a packet switched service is the Push to talk Over Cellular (PoC) communication service that provides wireless or wireline PoC Users with a virtually instantaneous method of connecting to other PoC Users by just the push of a button on their mobile terminals. The PoC communication service is half-duplex and can be compared to the communication performed when using conventional walkie-talkies. The PoC communication service can be used for person-to-person calls as well as for group communications over cellular networks, such as GSM, WCDMA or CDMA2000 networks, and/or fixed networks, such as any other IP network or interwork with legacy Push To Talk networks.

The PoC communication service has been developed by the Open Mobile Alliance (OMA) in the OMA PoC WG, which is currently described in PoC 1.0 Release and PoC 2.0 Release.

PoC Users uses PoC Clients, comprised in their mobile terminals, to access the PoC Service. In order to communicate using the PoC Service, the PoC Client establishes a PoC Session. The PoC Session is routed through at least one PoC Server. The at least one PoC Server may perform a Participating PoC Function and/or a Controlling PoC Function. However, both are necessary in order to establish a PoC Session. As a PoC Session has been established through one or several PoC Servers, the PoC Users participating in the PoC Session may start communicating over the half-duplex PoC communication service. It should be noted that the term PoC Session may hereinafter be used to refer to a 1-1 PoC Session, an Ad-hoc PoC Session, Pre-arranged PoC Group Session or a Chat PoC Group Session or the like.

A PoC User can also participate in one or more PoC Sessions at the same time. In order to make it possible for the PoC User to only receive Media from one PoC Session at a time, a function called Simultaneous PoC Sessions has been developed as part of the OMA PoC Specifications. The OMA PoC Specifications defines a priority order, which informs the PoC Server how to prioritize the one or more PoC Sessions if Media is received for more than one PoC Session. The PoC Server may then select from which PoC Session it shall forward Media to the PoC Client in the mobile terminal of the PoC User. The priority order of the PoC Sessions may be selected by the PoC User using the PoC Client.

However, as will be described more in detail in the description of the present invention, this may lead to instances where a PoC User is unavailable and not able to listen or take part in a PoC Session discussion, although information being shared by the other PoC Users in the PoC Session may be of high importance to the PoC User.

This may lead to PoC Users engaged in multiple simultaneous PoC Sessions missing interesting, necessary or even crucial information shared by other PoC Users in a PoC Session.

SUMMARY

A problem to which the present invention relates is the problem of a PoC User, engaged in more than one PoC Session, missing important information forwarded in one of said PoC Sessions.

This problem is addressed by a Push to talk Over Cellular (PoC) Server for providing PoC communication services in communications system, the PoC Server being arranged to simultaneously perform a first PoC Session between a first PoC Client and at least a second PoC Client, and at least one second PoC Session between the first PoC Client and at least a third PoC Client in accordance with a priority setting. The Push to talk Over Cellular (PoC) Server is characterized in that the PoC Server is further arranged to: receive, from said at least second PoC Client, a first information indicating that a user of said at least second PoC Client wants to alert the user of said first PoC Client about relevant Media being shared in said first PoC Session; or receive, from said at least third PoC Client, a second information indicating that a user of said at least third PoC Client wants to alert the user of said first PoC Client about relevant Media being shared in said at least second PoC Session; and if the received information is a notification, forward said received information to said first PoC Client; or if the received information is an override message, change said priority settings for said first and/or said at least second PoC Sessions associated with said first PoC Client in accordance with said override message.

The object of the present invention is further achieved by a method for providing PoC communication services in a communications system performing a first PoC Session between a first PoC Client and at least a second PoC Client, and at least one second PoC Session between said first PoC Client and at least a third PoC Client in accordance with a priority setting. The method is characterized by the steps of: receiving, from said at least second PoC Client, a first information indicating that a user of said at least second PoC Client wants to alert the user of said first PoC Client about relevant Media being shared in said first PoC Session; or receiving, from said at least third PoC Client, a second information indicating that a user of said at least third PoC Client wants to alert the user of said first PoC Client about relevant Media being shared in said at least second PoC Session; and if the received information is a notification, forwarding said received information to said first PoC Client; or if the received information is an override message, changing said priority setting for said first and/or said at least second PoC Sessions associated with said first PoC Client in accordance with said override message.

The object of the present invention is further achieved by a mobile terminal comprising a second PoC Client for providing PoC communication services in mobile radio communications system, the mobile terminal using the second PoC Client to participate in a first and at least a second PoC Session established through at least one PoC Server. The mobile terminal is characterized in that the PoC Client is arranged to: receive, from said at least one PoC Server, information indicating that a user of a first PoC Client in a mobile terminal participating in said first PoC Session wants to alert the user of said second PoC Client about relevant Media being shared in said first PoC Session, while said user of said second PoC Client is occupied in said at least second PoC Session.

The object of the present invention is further achieved by a method for providing PoC communication services to a user of a second PoC Client participating in a first and at least a second PoC Session of a PoC communication service in a communications system. The method is characterized by the steps of: receiving information indicating that a user of a first PoC Client participating in said first PoC Session wants to alert the user of said second PoC Client about relevant Media being shared in said first PoC Session, while said user of said second PoC Client is occupied in said at least second PoC Session.

The object of the present invention is further achieved by a mobile terminal comprising a first PoC Client for providing PoC communication services in mobile radio communications system, said mobile terminal using said first PoC Client to participate in at least one PoC Session established through at least one PoC Server. The mobile terminal is characterized in that the PoC Client is arranged to: send, in response to inputs from a user of said first PoC Client in said mobile terminal, information indicating that the user of said first PoC Client wants to alert a user of a second PoC Client in another mobile terminal about relevant Media being shared in said PoC Session in which both of said first and second PoC Clients are participating, while said user of said second PoC Client is occupied in at least one other PoC Session, to said at least one PoC Server.

The object of the present invention is further achieved by a method for providing PoC communication services to a user of a first PoC Client participating in a first PoC Session of a PoC communication service in a communications system. The method is characterized by the steps of: receiving inputs from a user of a first PoC Client indicating that the user of said first PoC Client wants to alert a user of a second PoC Client about relevant Media being shared in said PoC Session in which both of said first and second PoC Clients are participating, while said user of said second PoC Client is occupied in said at least second PoC Session; and sending said input information to at least one PoC Server.

The object of the present invention is also further achieved by a communications system comprising a PoC Server according to the above; and/or a mobile terminal according to the above.

The object of the present invention is also further achieved by a computer program product for use in at least one PoC Server, said at least one PoC Server being arranged to simultaneously perform a first PoC Session between a first PoC Client and at least a second PoC Client, and at least one second PoC Session between said first PoC Client and at least a third PoC Client, said computer program product comprising computer readable code means, which when run in the at least one PoC Server causes said at least one PoC Server to perform the steps of: receiving, from said at least second PoC Client, information indicating that a user of said at least second PoC Client wants to alert the user of said first PoC Client about relevant Media being shared in said first PoC Session in which both of said first PoC Client and said at least second PoC Client are participating; or receiving, from said at least third PoC Client, information indicating that a user of said at least third PoC Client wants to alert the user of said first PoC Client about relevant Media being shared in said at least second PoC Session in which both of said first PoC Client and said at least third PoC Client are participating; and forwarding said received information to said first PoC Client if the received information is a notification; or changing the priority settings for said first and/or at least second PoC Sessions associated with said first PoC Client if the received information is an override message.

An advantage of the above described invention is that it reduces the probability of instances where a PoC User engaged in more than one PoC Session misses important information forwarded in one of said PoC Sessions.

A further advantage of the above described invention is that it enables a PoC User participating in a PoC Session to notify another participating PoC User in that PoC Session of the fact that they are missing important information. The other participating PoC User may then be alerted, and is thereby able to perform appropriate actions in order to receive the important information in the PoC Session.

A further advantage of the above described invention is that it enables a PoC User participating in a PoC Session to override the priority settings of another participating PoC User in that PoC Session, and force the other participating PoC to receive the important information in the PoC Session.

A further advantage of the above described invention is that it enables personnel working with emergency services (such as fire fighting, crime fighting, medical treatment etc.), security services (such as surveillance, patrolling etc.) or military services to more readily and efficiently forward important information, and thereby achieve a faster response time and improved service.

A further advantage of the above described invention is that it enables supervisors of personnel working with emergency services, security services or military services to more readily and efficiently forward important information, and thereby more easily organize and increase the efficiency of the personnel. Thus, achieving an even faster response time and improved service.

A further advantage of the above described invention is that it is enabled to operate within any Converse IP Messaging system (CPM) or other frameworks for a PoC communication service. Here, the present invention may be enabled to operate in group sessions within said system or framework providing a half or full duplex service.

Further advantageous embodiments of the PoC Server, the mobile terminal comprising the PoC Client, the methods, the mobile radio communications system and the computer program product are set forth in the dependent claims, which correspondingly describe further advantageous embodiments of the present invention.

BRIEF DESCRIPTION OF THE DRAWINGS

The present invention will be described in more detail in the following with reference to the appended drawings, in which:

FIG. 10 is a signalling diagram describing another exemplary operation of a PoC Server and a mobile terminal comprising a PoC Client according to the present invention.

DETAILED DESCRIPTION

Figure 1:
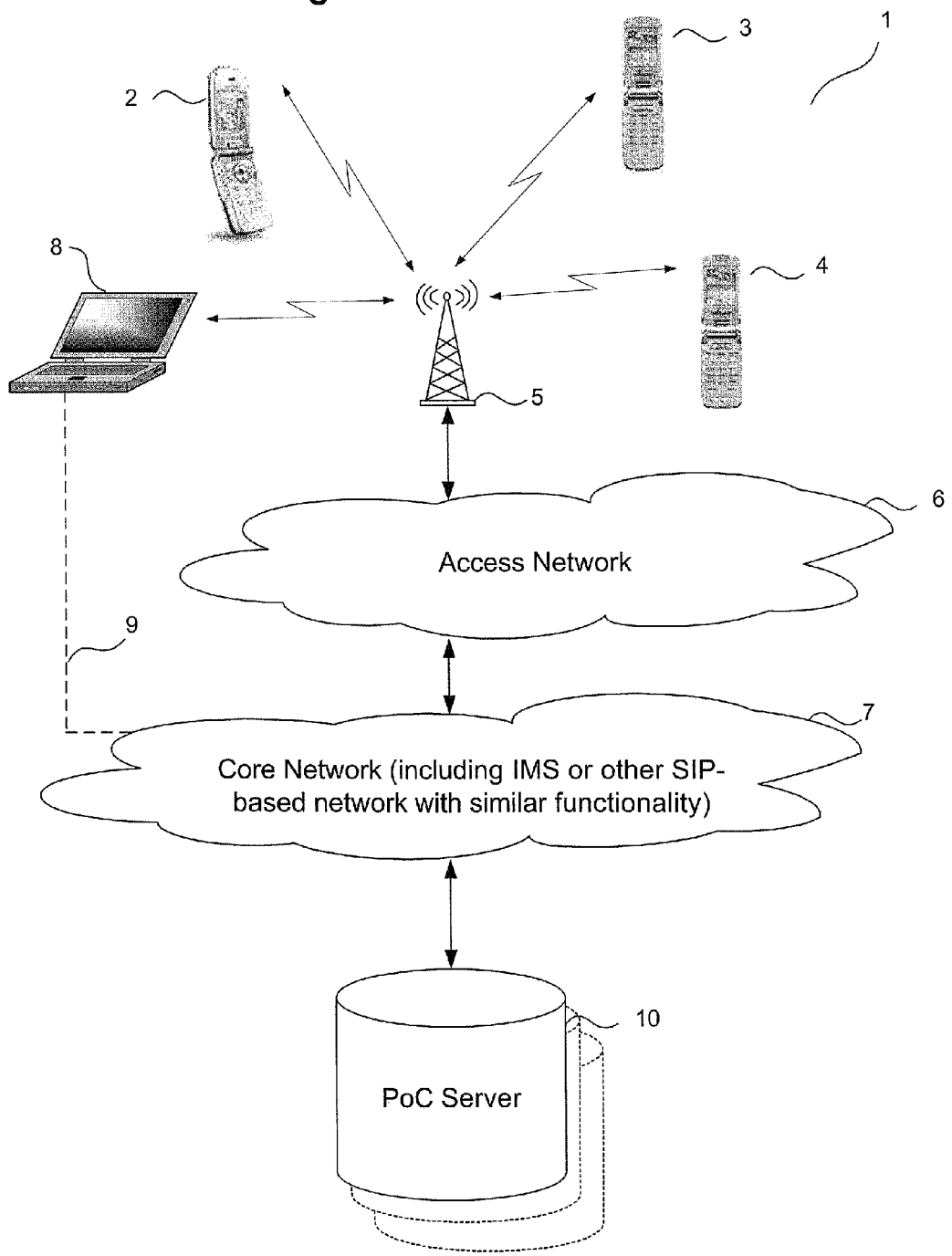
FIG. 1 is a conceptual overview illustrating a communications system employing a PoC communication service.

FIG. 1 is a conceptual overview illustrating a communications system, e.g. a mobile radio communications system 1, employing a PoC communication service according to prior art. A first mobile terminal 2 comprising a PoC Client A, a second mobile terminal 3 comprising a PoC Client B and a third mobile terminal 4 comprising a PoC Client C are located somewhere within the range or coverage area of a mobile radio communications service, illustrated by a base station 5. The mobile radio communications service is provided by an Access Network 6 and a Core Network 7.

The Access Network 6 of the mobile radio communications system 1 may be, for example, the common radio communications access networks, UTRAN (Universal Terrestrial Radio Access Network) and/or GERAN (GSM/EDGE Radio Access network) or the like. The Core Network 7 includes an IP Multimedia Subsystem (IMS) network or another SIP based systems containing the functionality of an IMS system. The Access Network 6 and the Core Network 7 may form a part of any conventional cellular network, such as, for example, the GSM, WCDMA or CDMA2000 networks or the like. However, it should be noted that the inner structure and details of the Access Network 6 or the Core Network 7 of the mobile radio communications system 1 is not relevant to the object of the present invention.

A computer terminal 8 comprising a PoC Client D is also shown in FIG. 1. The computer terminal 8 may comprise mobile radio communications means for accessing the mobile radio communications service; or may be arranged to connect to the PoC Communications service in the Core Network 7, IMS or other SIP based systems, through fixed access networks 9, such as an IP network or interwork with legacy Push To Talk networks.

An IP Multimedia Subsystem (IMS) network is an open, standardised, multimedia architecture for mobile and fixed IP services. The IMS network provides a wide variety of services, such as, for example, multimedia telecommunication services, chat based services or other user-to-user services as well as user-to-content services. Also, the IMS network may facilitate the offering of popular services such as, for example, voice over IP (VoIP), multiparty gaming, videoconferencing and content sharing etc. In particular, the IMS network may facilitate the offering of the Push to talk Over Cellular (PoC) communication service.

The Push to talk Over Cellular (PoC) communication service may be provided to the IMS network by at least one PoC Server 10. The at least one PoC server 10 may be an application server running on top of the IMS network or another SIP based systems containing the functionality of an IMS system. As described in the background section above, the at least one PoC Server 10 may perform a Participating PoC Function and/or a Controlling PoC Function, both of which are necessary in order to establish a PoC Session.

Figure 2:
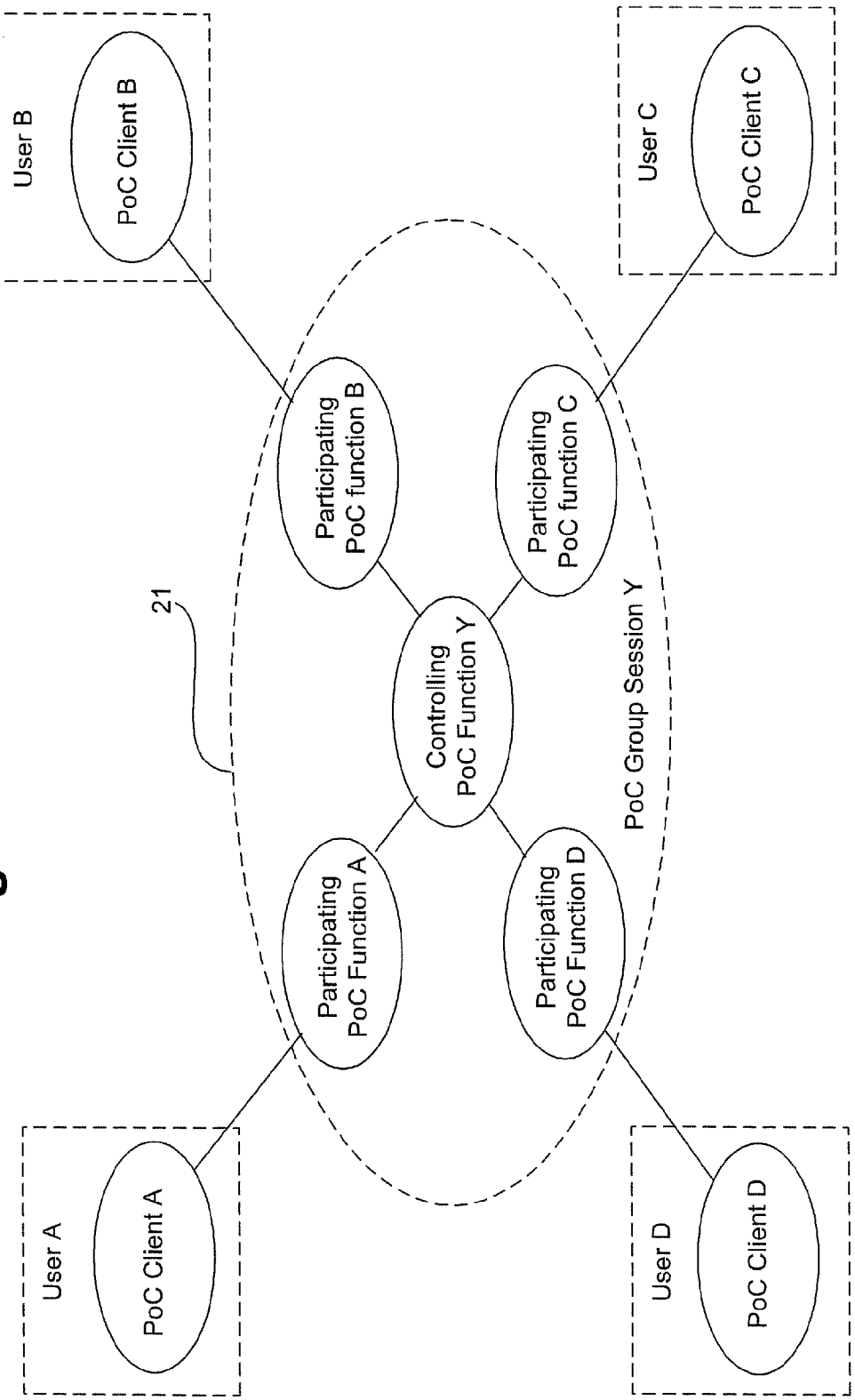
FIG. 2 is a block diagram illustrating the functional structure of a basic PoC Session according to the prior art.

In FIG. 2, a functional structure of a basic PoC Session is illustrated.

FIG. 2 shows four different PoC Users: PoC User A, PoC User B, PoC User C and PoC User D. Each PoC User A, B, C and D has a mobile terminal comprising a PoC Client. The mobile terminal of User A comprises a PoC Client A, the mobile terminal of User B comprises a PoC Client B, the mobile terminal of User C comprises a PoC Client C, and the mobile terminal of User D comprises a PoC Client D.

The PoC Users A, B, C and D may use the PoC Clients A, B, C and D, respectively, to access the PoC communication service. In order to communicate using the PoC communication service, a PoC Client may establish a PoC Session Y 21 or join an existing PoC Session Y 21. In FIG. 2, each of the PoC Clients A, B, C and D are currently a participating part in a PoC Session Y 21.

For each of the PoC Clients A, B, C and D participating in the PoC Session Y 21 there is one Participating PoC Function A, B, C and D, respectively. Each of the Participating PoC Functions A, B, C and D may arranged to operate in the PoC Server 10 or in separate or joint PoC Servers. The PoC Session Y 21 is controlled by a Controlling PoC Function Y. The Controlling PoC Function Y may be arranged to operate in the PoC Server 10, in any of said separate or joint PoC Servers comprising any of the Participating PoC Functions A, B, C and/or D, or in a separate PoC Server.

Since the PoC communication service is half-duplex, only one participant, i.e. PoC Client, is allowed to send Media at a time. The arbitration of the permission for the PoC Clients to send Media is controlled by the Controlling PoC Function Y. In order to perform said arbitration the Controlling PoC Function Y may use, for example, the Media Burst Control Protocol (MBCP) developed by the OMA PoC WG as described in "PoC User Plane", version 1.0.1, Open Mobile Alliance™, OMA-TS-PoC_User Plane-V1_0_1.

Any one of the PoC Users A, B, C and D may also participate in one or more additional PoC Sessions at the same time. In order to make it possible for any one of the PoC Users A, B, C and D to only receive Media from one PoC Session at a time, a Simultaneous PoC Session may be used in the Home PoC Network of the PoC User. The Home PoC Network is the PoC Server 10 currently performing the Participating PoC Function for a PoC Client of a PoC User. A Simultaneous PoC Session is illustrated in FIG. 3.

Figure 3:
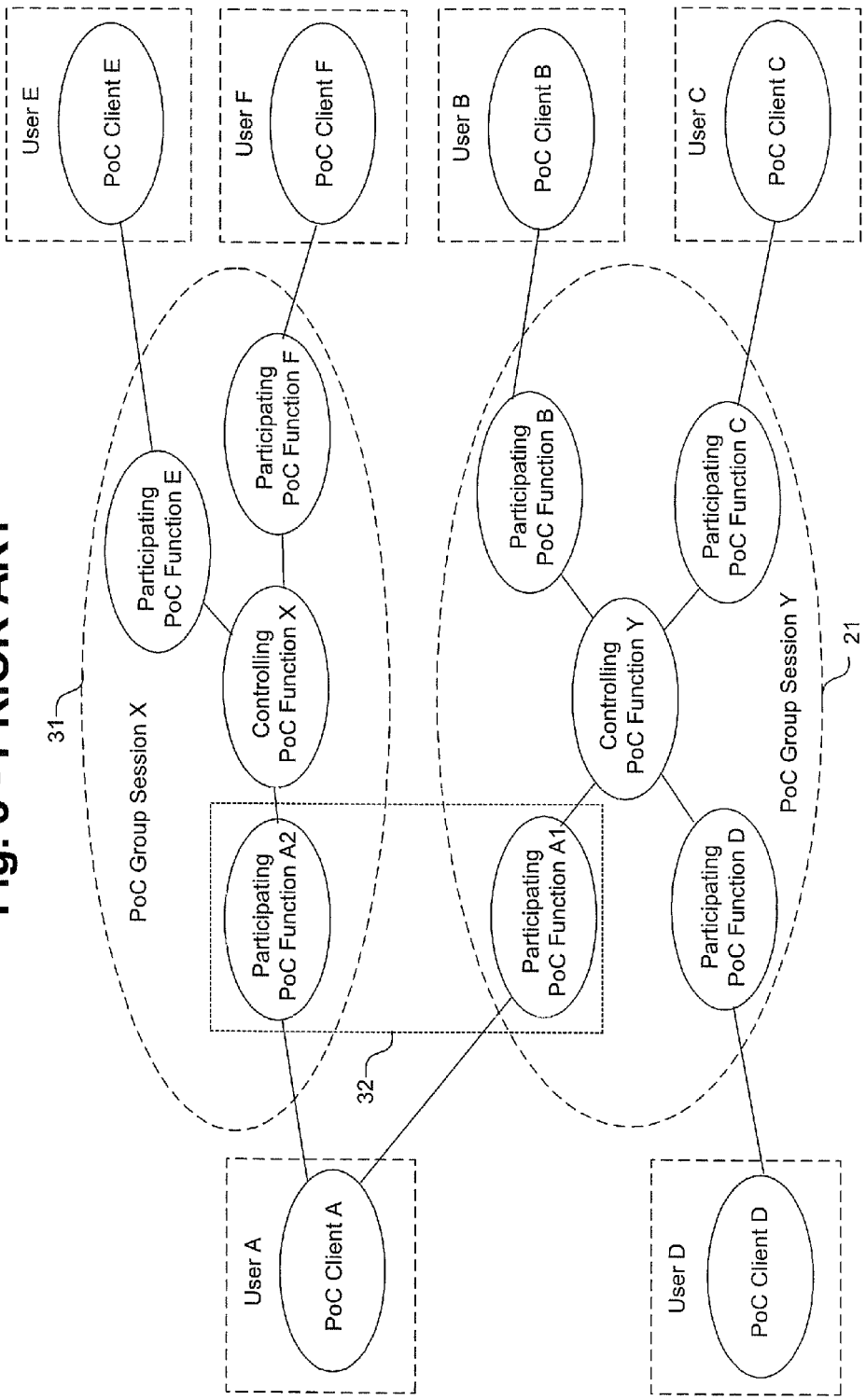
FIG. 3 is a block diagram illustrating the functional structure of Simultaneous PoC Sessions according to the prior art.

FIG. 3 shows the functional structure of a Simultaneous PoC Session as a PoC User A is involved in more than one PoC Session at the same time.

In FIG. 3, the PoC User A using a mobile terminal comprising the PoC Client A is participating in two different PoC Sessions, the PoC Session Y 21 (also shown in FIG. 2) and the PoC Session X 31. Also participating in the PoC Session X 31 is a PoC Client E in the mobile terminal of a PoC User E and a PoC Client F in the mobile terminal of a PoC User F. For both of the PoC Clients E and F participating in the PoC Session X 31 there is one Participating PoC Function E and F, respectively.

The PoC Session X 31 is controlled by the Controlling PoC Function X. Media sent in the PoC Session Y 21 and the PoC Session X 31 is routed via the same PoC Server 32 to the PoC User A. The PoC Server 32 can be said to comprise the Home PoC Network of the PoC User A. As the PoC Server 32, i.e. the Home PoC Network for the PoC User A, is participating in two different PoC Sessions it performs both the Participating PoC Function A1 for the PoC Session Y 21 and the Participating PoC Function A2 for the PoC Session X 31.

If the PoC Server 32 performing both of the Participating PoC Functions A1 and A2 in the Home PoC Network receives Media from the Controlling PoC Function Y and the Controlling PoC Function X at the same time, the PoC Server 32 will according to a priority order select from which of the PoC Sessions Y 21 or X 31 it shall forward Media to the PoC Client A in the mobile terminal of the PoC User A. The priority order of the PoC Server 32 may be defined by the OMA PoC Specifications.

The PoC User A using the PoC Client A may impact the priority order by selecting one of the PoC Sessions, for example, the PoC Session X 31, as the Primary PoC Session. This automatically set all other PoC Sessions that the PoC Client A may participate in as Secondary PoC Sessions, for example, the PoC Session Y 21. When Media is received from the Primary PoC Session, that is, the PoC Session X 31, the PoC Server 32 performing the Participating PoC Functions A1 and A2 in the Home PoC Network of the PoC User A will prioritize this Media over Media received from a Secondary PoC Session, that is, the PoC Session Y 21.

Media received by the PoC Server 32 from a Secondary PoC Session, i.e. the PoC Session Y 21, will only be forwarded to the PoC Client A in the mobile terminal of the PoC User A when there is no Media in the Primary PoC Session and if a conversation timer in the Primary PoC Session is not running. A conversation timer is started in a PoC Session when no Media is received in a PoC Session. This is performed in order to allow other PoC Users a chance to speak before Media in other PoC Sessions is forwarded.

The PoC User A using the PoC Client A may also lock himself to one of the PoC Sessions Y 21 or X 31. If the PoC Client A is locked to a PoC Session Y 21 or X 31, the PoC Server 32 will only forward Media from the locked PoC Session to the PoC Client A, regardless if there is Media received from another PoC Session and regardless whether or not that PoC Session is a Primary PoC Session. No Media from other PoC Sessions will be forwarded by the PoC server 32 to the PoC Client A until the PoC User A either unlocks the locked PoC Session or request permission to send Media in one of the other PoC Sessions.

According to the prior art, the decision to select a PoC Session Y 21 or X 31 to be a Primary PoC Session or a Secondary PoC Session is reserved for the PoC User A using the PoC Client A. The decision can not be influenced by any other PoC User B-F participating in any of the PoC Sessions Y 21 or X 31. It should be noted that a PoC Session Y 21 or X 31 may have an infinite duration, and that a PoC Session Y 21 or X 31 only is released by the PoC Server performing the Controlling PoC Function Y or X, respectively, when none of the PoC Users in the PoC Sessions Y 21 or X 31 is connected and participates in the PoC Sessions Y 21 or X 31.

Furthermore, according to the prior art, it is, for example, not possible for a PoC User B, C or D participating in a PoC Session Y 21 to communicate with the PoC User A, if the PoC User A has selected the PoC Session X 31 as its Primary PoC Session, and the PoC User A is currently participating in an on-going conversation in said PoC Session X 31. It is also, for example, not possible for a PoC User B, C or D participating in a PoC Session Y 21 to communicate with the PoC User A, if the PoC User A is locked to the PoC Session X 31. This, however, is independent of whether or not the PoC User A is currently participating in an on-going conversation.

These properties in a conventional PoC communication service may result in that a PoC User that is simultaneously engaged in more than one PoC Session may miss important information that is forwarded in one of the PoC Sessions. This may occur, for example, if a discussion in a PoC Session that is set as the Primary PoC Session by a PoC User is intensive and ongoing for a long period of time, or if a PoC User has forgot to unlock a PoC Session and therefore is not available to listen to other ongoing PoC Sessions.

This may be a crucial problem, e.g. for personnel or supervisors working with emergency services (such as fire fighting, crime fighting, medical treatment etc.), security services (such as surveillance, patrolling etc.) or military services etc. that rely on a fast and efficient communication in order to perform their job satisfactory.

These issues are addressed in a PoC Server and at least one mobile terminal comprising a PoC Client according to the inventive features of the present invention. Exemplary embodiments of the PoC Server and the mobile terminal comprising a PoC Client are presented in the following.

Figure 4:
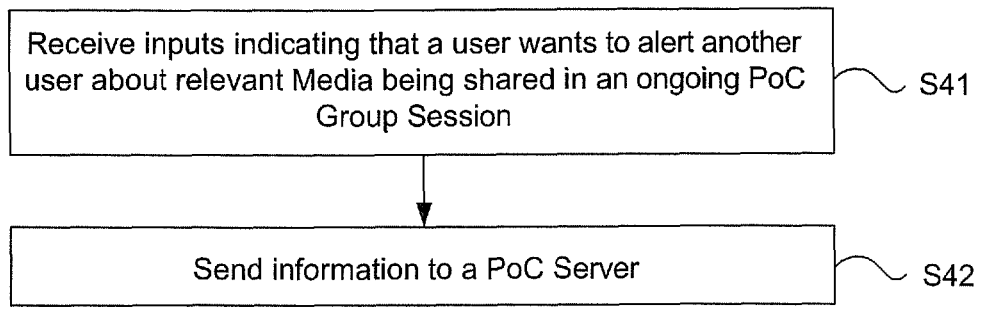
FIG. 4 is a flowchart illustrating an exemplary operation of a mobile terminal comprising a PoC Client according to the present invention.

FIG. 4 is a flowchart illustrating an exemplary operation of a mobile terminal comprising a PoC Client according to the present invention.

In step S41, inputs may be received indicating that a PoC User wants to alert another PoC User about relevant Media being shared in an ongoing PoC Session. For example, inputs from a PoC User of a first PoC Client may be received in a first mobile terminal indicating that the PoC User of the first PoC Client wants to alert a PoC User of a second PoC Client in a second mobile terminal about relevant Media being shared in an ongoing PoC Session in which both of the PoC Clients are participating.

In step S42, information may be sent to a PoC Server. For example, the first PoC Client in the first mobile terminal may send information to a PoC Server indicating that the PoC User of the first PoC Client wants to alert the PoC User of a second PoC Client about relevant Media being shared in an ongoing PoC Session in which both of the PoC Clients are participating.

These steps allow a PoC User in a PoC Session having relevant Media, i.e. important information, to share, to transmit a message to another PoC User even though said other PoC User is currently participating in an ongoing conversation in another PoC Session and thus is unavailable to hear anything transmitted the PoC Session or is locked to the other PoC Session.

Figure 5:
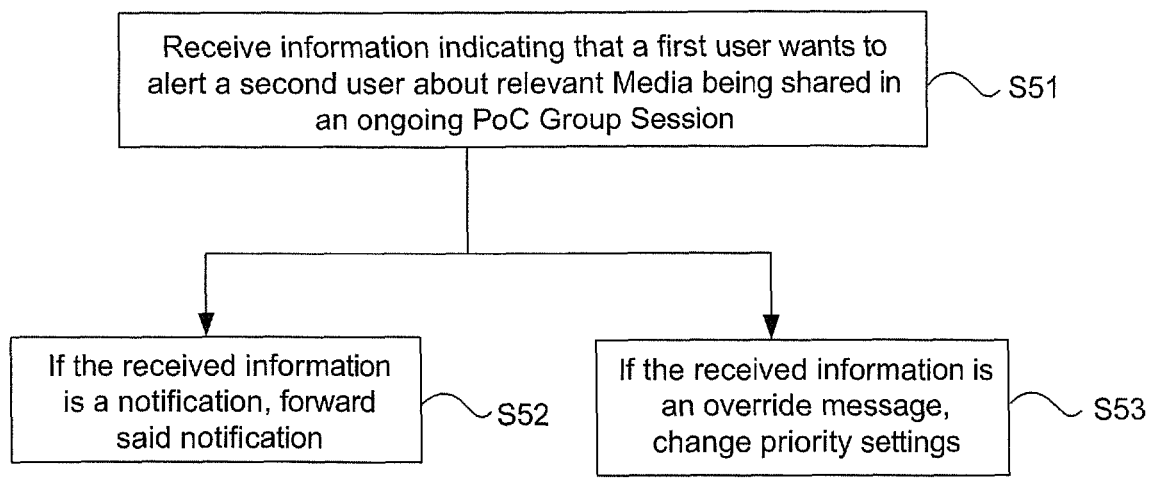
FIG. 5 is a flowchart illustrating an exemplary operation of a PoC Server according to the present invention.

FIG. 5 is a flowchart illustrating an exemplary operation of a PoC Server according to the present invention.

In step S51, information may be received indicating that a first PoC User wants to alert a second PoC User about relevant Media being shared in an ongoing PoC Session. For example, a PoC Server performing at least a Participating PoC Function for a first PoC Client in a first mobile terminal may receive information indicating that the PoC User of the first PoC Client in the first terminal wants to alert the PoC User of a second PoC Client in a second mobile terminal about relevant Media being shared in an ongoing PoC Session in which both of the PoC Clients are participating.

In step S52, if the received information is a notification, said notification may be forwarded. For example, if the received information is a notification, the PoC Server performing at least the Participating PoC Function for the first PoC Client may forward the notification to the second PoC Client. If the PoC Server performing the Participating PoC Function for the first PoC Client is not the PoC Server that also performs the Controlling PoC Function for the PoC Session and/or the Participating PoC Function for the second PoC Client, the notification may also be routed through the PoC Servers performing those functions as well. Otherwise, in step S53, if the received information is an override message, priority settings may be changed. For example, if the received information is an override message, a PoC Server performing at least the Participating PoC Function for the second PoC Client may change the priority settings for ongoing PoC Sessions associated with the second PoC Client in accordance with the override message. If the PoC Server performing at least the Participating PoC Function for the second PoC Client is not the PoC Server that performs the Controlling PoC Function for the PoC Session and/or the Participating PoC Function for the first PoC Client, the override message may be forwarded by the PoC Servers performing those functions to the PoC Server performing at least the Participating PoC Function for the second PoC Client.

These steps allow notifications and/or override messages to be transmitted between PoC Users of a PoC communication service.

Figure 6:
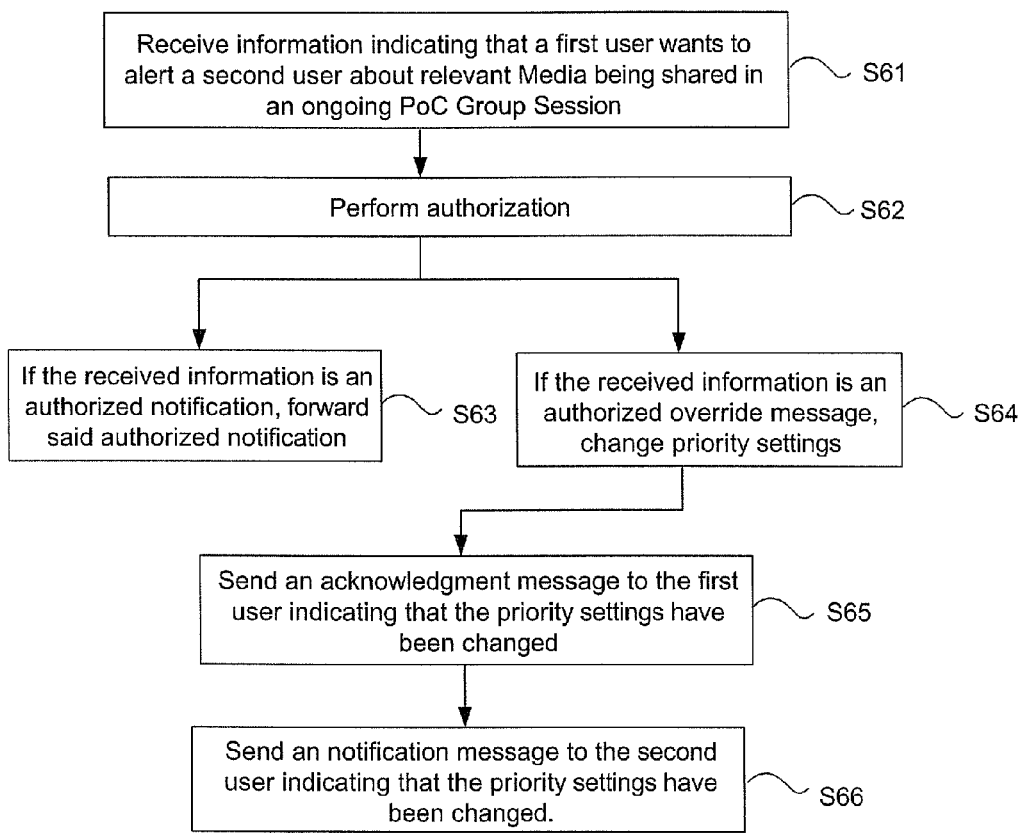
FIG. 6 is a flowchart illustrating a further exemplary operation of a PoC Server according to the present invention.

FIG. 6 is a flowchart illustrating another exemplary operation of a PoC Server according to the present invention. Step S61 is here identical to step S51 in FIG. 5.

In step S62, authorization may be performed. It may be determined if the PoC User of the first PoC Client in the first mobile terminal is authorized to alert the PoC User of said second PoC Client in the second mobile terminal according to the received information. Authorization may be performed by the PoC Server using the PoC User's access policies that is controlled by the PoC Users in the PoC Clients of the mobile terminals. The PoC User's access policies may be set by the PoC User before the start of the PoC Session as a part of the PoC User's configuration of the PoC Service. This may be performed by using an XML Document Management Client (XDMC) in the mobile terminal.

In step S63, if the received information is an authorized notification, the authorized notification may be forwarded. For example, the authorized notification may be forwarded to the second PoC Client in the second mobile terminal. Alternatively, in step S64, if the received information is an override message, priority settings may be changed. For example, if the received information is an authorized override message, the priority settings for ongoing PoC Sessions associated with the second PoC Client may be changed according to the authorized override message.

In step S65, following the step S64, an acknowledgment message may be sent to the first PoC User indicating that the priority settings have been changed. For example, an acknowledgment message may be sent to the first PoC Client indicating that the priority settings associated with the second PoC Client in the second mobile terminal have been changed. In step S66, a notification message may be sent to the second PoC User indicating that the priority settings have been changed. For example, a notification message may be sent to the second PoC Client in the second terminal indicating that the priority settings associated with the second PoC Client have been changed.

These steps allow notifications and/or override messages to be authorized before being transmitted between PoC Users of a PoC communication service.

Figure 7:
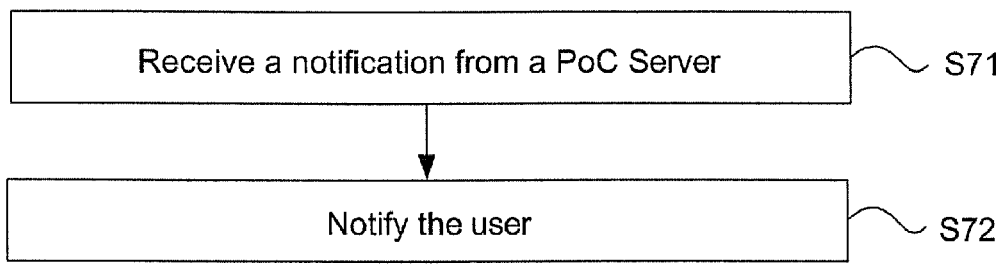
FIG. 7 is a flowchart illustrating another exemplary operation of a mobile terminal comprising a PoC Client according to the present invention.

FIG. 7 is a flowchart illustrating another exemplary operation of a mobile terminal comprising a PoC Client according to the present invention.

In step S71, a notification from a PoC Server may be received. For example, a notification may be received, in a first PoC Client in a first mobile terminal, from a PoC Server indicating that a PoC User of a second PoC Client in a second mobile terminal has important information to share with the PoC User of the first PoC Client in the first mobile terminal in an ongoing PoC Session. In step S72, the PoC User may be notified. For example, the PoC User of the first PoC Client in the first mobile terminal may be notified that the PoC User of the second PoC Client in the second mobile terminal has important information to share with the PoC User of the first PoC Client in the first mobile terminal in an ongoing PoC Session.

This allows the PoC User of the first PoC Client in the first mobile terminal to make an informed decision of whether to remain in the other PoC Session or switch over to the ongoing PoC Session from which the notification originated.

Figure 8:
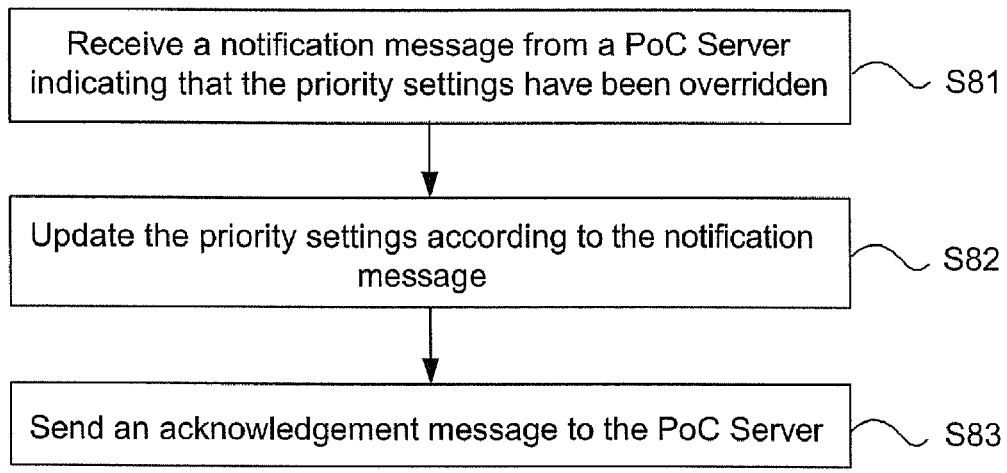
FIG. 8 is a flowchart illustrating another exemplary operation of a mobile terminal comprising a PoC Client according to the present invention.

FIG. 8 is a flowchart illustrating another exemplary operation of a mobile terminal comprising a PoC Client according to the present invention.

In step S81, a notification message may be received from a PoC Server indicating that the priority settings have been overridden. For example, a notification message may be received, in a first PoC Client in a first mobile terminal, from a PoC Server indicating that the priority settings of an ongoing PoC Session for the first PoC Client in the first mobile terminal have been overridden. In step S82, the priority settings according to the notification message may be updated. For example, the priority settings for current PoC Sessions in the first PoC Client in the first mobile terminal may be updated according to the notification message.

In step S83, an acknowledgement message to the PoC Server may be sent. For example, an acknowledgement message may be sent to the PoC Server indicating that the priority settings for the ongoing PoC Sessions have been changed in the first PoC Client in the first mobile terminal.

This allows the PoC User of the first PoC Client in the first mobile terminal to immediately be able to receive important information from another PoC User in an ongoing PoC Session, wherein said other PoC User may be authorized to override the priority settings associated with the first PoC Client in the first mobile terminal.

Figure 9:
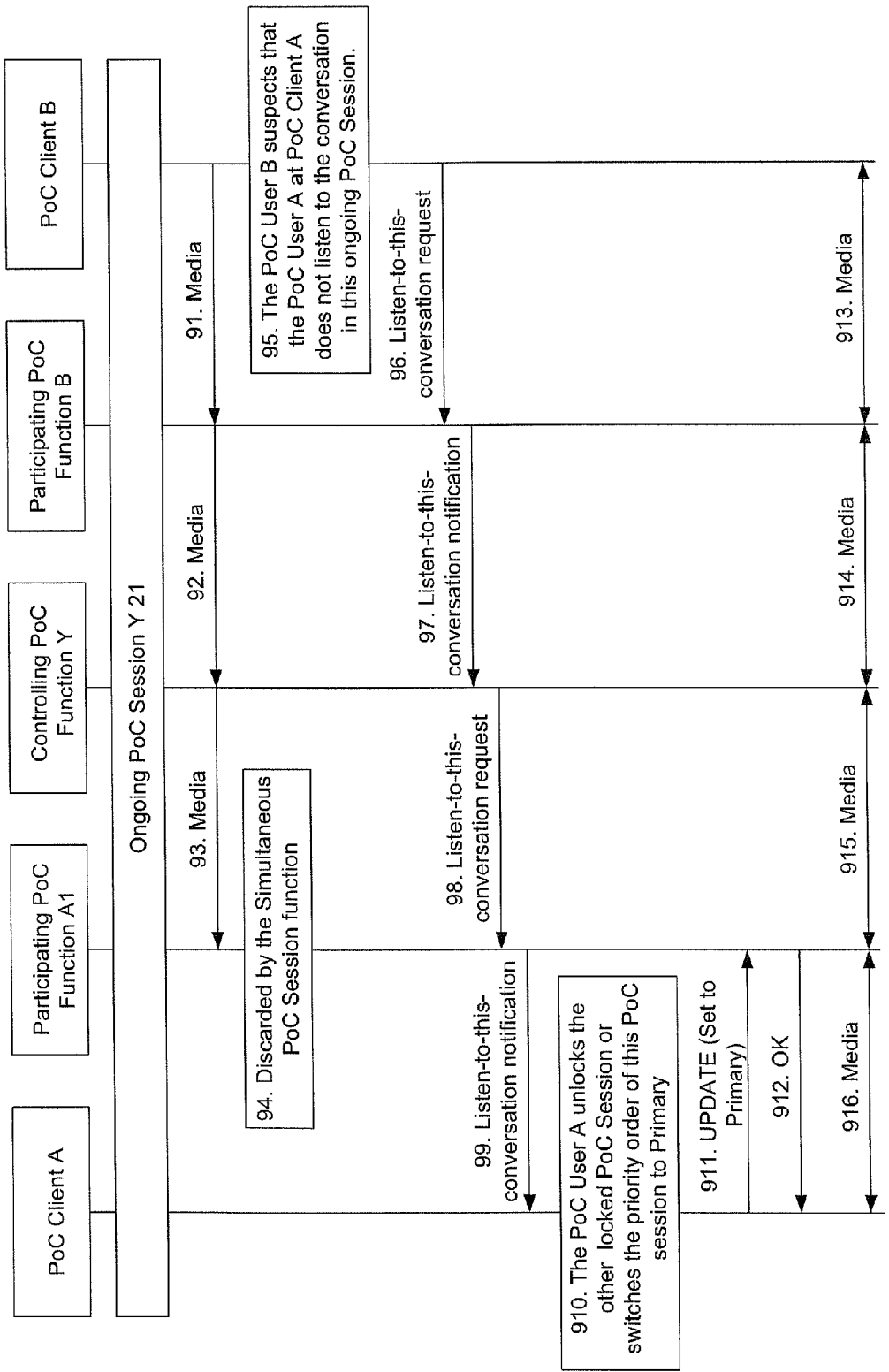
FIG. 9 is a signalling diagram describing an exemplary operation of a PoC Server and a mobile terminal comprising a PoC Client according to the present invention.

FIG. 9 is a signalling diagram describing in more detail an exemplary operation of a PoC Server, a mobile terminal comprising a PoC Client A and a mobile terminal comprising a PoC Client B according to the present invention.

In FIG. 9, a PoC User A using a mobile terminal comprising the PoC Client A is engaged and participating in an ongoing PoC Session Y 31 with the PoC User B using a mobile terminal comprising the PoC Client B. The ongoing PoC Session Y 31 has been established as described in reference to the description of FIG. 1-3.

The PoC User B has important information that the PoC User B is in need to convey to or tell the PoC User A. The PoC User B therefore needs the full attention of the PoC User A that is engaged and participating in several simultaneous PoC Sessions. However, as the PoC User B attempts to transmit Media 91-93 to the PoC User A, the PoC Server 32 performing the Participating PoC Function A1 and Simultaneous PoC Session for the PoC Client A will discard 94 the Media. This because the PoC User A has set the priority settings of the Simultaneous PoC Session such that the PoC User A is locked to another PoC Session, or such that the ongoing PoC Session Y 31 is a Secondary PoC Session. In the latter of these cases, the PoC User A may currently be unavailable, due to an engagement in a discussion in the set Primary PoC Session. Thus, the PoC User B will not receive an answer from the PoC User A to the Media that was sent, and may therefore suspect 95 that the PoC User A is currently unavailable or is not listening to the conversation in the ongoing PoC Session Y 31.

According to the present invention, the PoC Client B in the mobile terminal may, in response to inputs from the PoC User B, be arranged to send a notification 96 to the PoC Server performing the Participating PoC Function B. This notification is referred to in the following as a listen-to-this-conversation notification. The listen-to-this-conversation notification may include, for example, the identity of the PoC User(s)

that is to be notified (i.e. in this case the PoC Client A), the identity of the PoC User that is sending the notification (i.e. in this case the PoC Client B), and a text string or the like (e.g. to explain why the PoC Client A should listen to the conversation in the ongoing PoC Session Y 31). It should be noted that the identity of the PoC User(s) that is to be notified may be the anonymous identity of the PoC User(s) received in the participant information which may be received from the PoC Server as part of the setup of the PoC Session. This may be relevant when the PoC User(s) has requested Privacy in the PoC Session.

The listen-to-this-conversation notification may be implemented, for example, in a new or existing Media Burst Control Message (MBCP) or a SIP message. The SIP message (such as, for example, INVITE, UPDATE, INFO or MESSAGE etc.) may carry the information of the listen-to-this-conversation notification in, for example, the Session Description Protocol (SDP), if allowed in the SIP message; or a new or existing header field; or in the message body; or any combination of the above.

Upon receiving the listen-to-this-conversation notification from the PoC Client B, the PoC Server performing the Participating PoC Function B may determine if the PoC Client B is authorized to send the listen-to-this-conversation notification. The PoC Server performing the Participating PoC Function B may perform the authorisation by, for example, checking its local policies and/or QoE profile (Quality of Experience). If the PoC Client B is authorized to send the listen-to-this-conversation notification, the PoC Server performing the Participating PoC Function B may forward the listen-to-this-conversation notification 97 to the PoC Server performing the Controlling PoC Function Y.

Upon receiving the listen-to-this-conversation notification from the PoC Server performing the Participating PoC Function B, the PoC Server performing the Controlling PoC Function Y may authorize the listen-to-this-conversation notification. The PoC Server performing the Controlling PoC Function Y may perform the authorisation by, for example, checking its PoC Document, the MB-level (Media Burst level) and/or its QoE profile. If the listen-to-this-conversation notification is authorized, the PoC Server performing the Controlling PoC Function Y may forward the listen-to-this-conversation notification 98 to the PoC Server performing the Participating PoC Function A1 for the PoC Client A.

The PoC Server performing the Participating PoC Function A1 may, upon receiving the listen-to-this-conversation notification from the PoC Server performing the Controlling PoC Function Y, authorize the listen-to-this-conversation notification from the PoC Client B. The PoC Server performing the Participating PoC Function A1 may perform the authorisation by, for example, checking its local policies and/or QoE profile (Quality of Experience). If the listen-to-this-conversation notification is authorized, the PoC Server performing the Participating PoC Function A1 may forward the listen-to-this-conversation notification 99 to the PoC Client A in the mobile terminal of the PoC User A.

Upon receiving the listen-to-this-conversation notification from the PoC Server performing the Participating PoC Function A1, the PoC Client A may be arranged to notify the PoC User A that the PoC User B has important information and needs the PoC User A's full attention. The PoC User A may then either unlock the other PoC Session or reset the priority settings of the Simultaneous PoC Session such that the ongoing PoC Session Y 31 is the Primary PoC Session 910. The PoC Client A may also send a update message 911 to the PoC Server performing the Participating PoC Function A1 informing the Participating PoC Function A1 that the priority settings for the Simultaneous PoC Session has changed, and that ongoing PoC Session Y 31 now is set as the Primary PoC Session. The update message may, for example, be a SIP-message, such as, an UPDATE according to the OMA PoC Specifications.

The PoC Server performing the Participating PoC Function A1 may then change the priority settings for the Simultaneous PoC Session, and return an acknowledgement message 912. The acknowledgement message may, for example, be a SIP-message, such as, an OK message.

Media sent by the PoC Client B from the PoC User B may now be forwarded 913-916 to the PoC Client A in the mobile terminal of the PoC User A. Thus, the PoC User A may now listen to the conversation in the ongoing PoC Session Y 31 and receive the important information from the PoC Client B. Preferably, the PoC User A may also send Media in the ongoing PoC Session Y 31, when the PoC User A has changed the priority settings, in order to let the PoC User B know that the PoC User A is now listening.

FIG. 10 is a signalling diagram describing in more detail another exemplary operation of a PoC Server, a mobile terminal comprising a PoC Client A and a mobile terminal comprising a PoC Client B according to the present invention.

The scenario described in FIG. 10 in similar to the scenario described in FIG. 9. A PoC User A using a mobile terminal comprising the PoC Client A is engaged and participating in an ongoing PoC Session Y 31 with the PoC User B using a mobile terminal comprising the PoC Client B. The ongoing PoC Session Y 31 has been established as described in reference to the description of FIG. 1-3. The signalling described in 101-105 is the same as the signalling 91-95 described in reference to FIG. 9. The PoC User B has important information that the PoC User B is in need to convey to or tell the PoC User A and therefore needs the full attention of the PoC User A. The PoC User A is engaged and participating in several simultaneous PoC Sessions.

However, in the scenario described in FIG. 10, the PoC User B may, for example, be a supervisor, chief, manager or the like, and therefore may have a higher classification and authorisation to perform certain task in order to effectively control and lead the efforts of his staff and personnel. The PoC User A may be another supervisor, chief, manager or the like, or a member of the PoC User B's staff or personnel. In order to be able to reach the PoC User A, the PoC User B may decide to override the priority settings of the Simultaneous PoC Session for the PoC User A.

According to the present invention, the PoC Client B in the mobile terminal may, in response to inputs from the PoC User B into the mobile terminal, be arranged to send an override message 106 to the PoC Server performing the Participating PoC Function B. This override message is referred to in the following as a priority-setting-override message. The priority-setting-override message may include, for example, the identity of the PoC User(s) whose priority settings shall be overridden/changed (i.e. in this case the PoC Client A), the identity of the PoC User that is sending the priority-setting-override message (i.e. in this case the PoC Client B), a text string or the like (e.g. to explain why priority settings of the PoC Client A is overridden), and a new priority setting for the ongoing PoC Session Y 31 (e.g. Primary, Secondary, Locked, Unlocked). The priority-setting-override message may be implemented, for example, in a new or existing Media Burst Control Message (MBCP) or a SIP message. The SIP message (such as, for example, INVITE, UPDATE, INFO or MESSAGE etc.) may carry the information of the priority-setting-override message in, for example, the Session Description Protocol (SDP), if allowed in the SIP message; or a new or existing header field; or in the message body; or any combination of the above.

Upon receiving the priority-setting-override message from the PoC Client B, the PoC Server performing the Participating PoC Function B may determine if the PoC Client B is authorized to send the priority-setting-override message. The PoC Server performing the Participating PoC Function B may perform the authorisation by, for example, checking its local policies and/or QoE profile (Quality of Experience). If the PoC Client B is authorized to send the priority-setting-override message, the PoC Server performing the Participating PoC Function B may forward the priority-setting-override message 107 to the PoC Server performing the Controlling PoC Function Y.

Upon receiving the priority-setting-override message from the PoC Server performing the Participating PoC Function B, the PoC Server performing the Controlling PoC Function Y may authorize the priority-setting-override message. The PoC Server performing the Controlling PoC Function Y may perform the authorisation by, for example, checking its PoC Document, the MB-level (Media Burst level) and/or its QoE profile. If the priority-setting-override message is authorized, the PoC Server performing the Controlling PoC Function Y may forward the priority-setting-override message 108 to the PoC Server performing the Participating PoC Function A1 for the PoC Client A.

The PoC Server performing the Participating PoC Function A1 may, upon receiving the priority-setting-override message from the PoC Server performing the Controlling PoC Function Y, authorize the priority-setting-override message from the PoC Client B. The PoC Server performing the Participating PoC Function A1 may perform the authorisation by, for example, checking its local policies, PoC User access policies and/or QoE profile (Quality of Experience). If the priority-setting-override message is authorized, the PoC Server performing the Participating PoC Function A1 may update the priority settings 109 for the Simultaneous PoC Session according to the received priority-setting-override message from the PoC User B.

After updating the priority settings, the PoC Server performing the Participating PoC Function A1 may be arranged to send an acknowledgement message 1010 towards the PoC Client B. The acknowledgment message is referred to in the following as a priority-setting-override ACK, and may be implemented based on the priority-setting-override message received from the PoC Client B, for example, as a MBCP message. The priority-setting-override ACK may then be forwarded 1011-1012 by the PoC Server performing the Controlling PoC Function Y and the PoC Server performing the Participating PoC Function B to the PoC Client B.

The PoC Server performing the Participating PoC Function A1 may further be arranged to send a notification message 1013, that is, a priority-settings-overridden message, to the PoC Client A in order to inform the PoC Client A that priority settings for the Simultaneous PoC Session has changed. The PoC Client A may be arranged to respond to the priority-settings-overridden message by sending a priority-settings-overridden ACK 1014 to the PoC Server performing the Participating PoC Function A1.

Although not shown in FIG. 10, the PoC Server performing the Participating PoC Function A1 may also be arranged to send further notification messages to other PoC Servers performing Simultaneous PoC Sessions depending on the change in the priority settings. For example, if a Primary PoC Session is changed to a Secondary PoC Session, there is no need for a PoC Server performing the Participating PoC Function for the PoC Session to send further notifications. However, if a Secondary PoC Session is changed to a Primary PoC Session, it may be necessary for the PoC Server performing the Participating PoC Function for the PoC Session to send a further notification to, for example, a PoC Server performing the Participating PoC Function for another PoC Session that, prior to the change, was set as Primary, notifying the PoC Server of the change from Primary to Secondary.

Upon receiving the priority-setting-override ACK from the PoC Server performing the Participating PoC Function B, the PoC Client B may be arranged to indicate to the PoC User B that the priority settings for the PoC User A now has been changed. Media sent by the PoC Client B from the PoC User B may now be forwarded 1015-1018 to the PoC Client A in the mobile terminal of the PoC User A. Thus, the PoC User B may present the PoC Client A with the important information through the conversation in the ongoing PoC Session Y 31.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A Push to talk Over Cellular [PoC] Server for providing PoC communication services in a communications system, said PoC Server being arranged to simultaneously perform a first PoC Session between a first PoC Client and at least a second PoC Client, and at least one second PoC Session between said first PoC Client and at least a third PoC Client in accordance with a priority setting, wherein said PoC Server is operative to:

receive, from said at least second PoC Client, a first information indicating that a user of said at least second PoC Client wants to alert the user of said first PoC Client about relevant Media being shared in said first PoC Session; or receive, from said at least third PoC Client, a second information indicating that a user of said at least third PoC Client wants to alert the user of said first PoC Client about relevant Media being shared in said at least second PoC Session; and, if the received information is a notification, forward said received information to said first PoC Client; or, if the received information is an override message, change said priority settings for said first and/or said at least second PoC Sessions associated with said first PoC Client in accordance with said override message.

2. The PoC Server according to claim 1, further arranged to perform an authorization of said received information from said at least second or third PoC Client.

3. The PoC Server according to claim 2, wherein said authorization is performed by using local policies, QoE-profiles, PoC Documents, MB-levels or any combination thereof.

4. The PoC Server according to claim 1, further arranged to:

if the priority settings for said first and/or at least second PoC Sessions associated with said first PoC Client has been changed in response to the received information, send an acknowledgment message to said at least second or third PoC Client indicating that the priority settings associated with said first PoC Client has been changed; and, send an notification message to said first PoC Client indicating that the priority settings associated with said first PoC Client has been changed.

5. A method for providing Push to talk Over Cellular (PoC) communication services in a communications system performing a first PoC Session between a first PoC Client and at least a second PoC Client, and at least one second PoC Session between said first PoC Client and at least a third PoC Client in accordance with a priority setting, comprising the steps of:
receiving, from said at least second PoC Client, a first information indicating that a user of said at least second PoC Client wants to alert the user of said first PoC Client about relevant Media being shared in said first PoC Session; or,
receiving, from said at least third PoC Client, a second information indicating that a user of said at least third PoC Client wants to alert the user of said first PoC Client about relevant Media being shared in said at least second PoC Session; and,
if the received information is a notification, forwarding said received information to said first PoC Client; or, if the received information is an override message, changing said priority setting for said first and/or said at least second PoC Sessions associated with said first PoC Client in accordance with said override message.

6. A method according to claim 5, further comprising the steps of:
performing an authorization of said received information from said at least second or third PoC Client;
sending, if the priority settings for said first and/or at least second PoC Sessions associated with said first PoC Client has been changed in response to the received information, an acknowledgment message to said at least second or third PoC Client indicating that the priority settings associated with said first PoC Client has been changed; and,
sending, if the priority settings for said first and/or at least second PoC Sessions associated with said first PoC Client has been changed in response to the received information, a notification message to said first PoC Client indicating that the priority settings associated with said first PoC Client has been changed.

7. A mobile terminal comprising a second Push to talk Over Cellular (PoC) Client for providing PoC communication services in mobile radio communications system, said mobile terminal using said second PoC Client to participate in a first and at least a second PoC Session established through at least one PoC Server, wherein said PoC Client is arranged to:
receive, from said at least one PoC Server, information indicating that a user of a first PoC Client in a mobile terminal participating in said first PoC Session wants to alert the user of said second PoC Client about relevant Media being shared in said first PoC Session, while said user of said second PoC Client is occupied in said at least second PoC Session.

8. The mobile terminal comprising a second PoC Client according to claim 7, wherein said second PoC Client is further arranged to:
if the received information is a notification, notify the user of said second PoC Client that the user of a said first PoC Client in the other mobile terminal has relevant Media to share with the user of said second PoC Client.

9. The mobile terminal comprising a second PoC Client according to claim 7, wherein said second PoC Client is further arranged to:
if the received information is an notification message indicating that the priority settings associated with said second PoC Client has been changed, update the priority settings in said second PoC Client according to the information in the notification message.

10. A method for providing Push to talk Over Cellular (PoC) communication services to a user of a second PoC Client participating in a first and at least a second PoC Session of a PoC communication service in a communications system, comprising the step of:
receiving information indicating that a user of a first PoC Client participating in said first PoC Session wants to alert the user of said second PoC Client about relevant Media being shared in said first PoC Session, while said user of said second PoC Client is occupied in said at least second PoC Session.

11. The method according to claim 10, further comprising the step of:
notifying, if the received information is a notification, the user of said second PoC Client that the user of said first PoC Client in the other mobile terminal has relevant Media to share with the user of said second PoC Client.

12. The method according to claim 10, further comprising the step of:
updating, if the received information is an notification message indicating that the priority settings associated with said second PoC Client has been changed, the priority settings in said second PoC Client according to the information in the notification message.

13. A mobile terminal comprising a first Push to talk Over Cellular (PoC) Client for providing PoC communication services in mobile radio communications system, said mobile terminal using said first PoC Client to participate in at least one PoC Session established through at least one PoC Server, wherein said PoC Client is arranged to:
send, in response to inputs from a user of said first PoC Client in said mobile terminal, information indicating that the user of said first PoC Client wants to alert a user of a second PoC Client in another mobile terminal about relevant Media being shared in said PoC Session in which both of said first and second PoC Clients are participating, while said user of said second PoC Client is occupied in at least one other PoC Session, to said at least one PoC Server.

14. The comprising a first PoC Client according to claim 13, wherein said information is incorporated in a new or existing MBCP message, or a SIP-message.

15. The mobile terminal comprising a first PoC Client according to claim 13, wherein said first PoC Client is further arranged to:
send a notification comprising said information to said at least one PoC Server if indicated by input from the user of said first PoC Client in the mobile terminal.

16. The mobile terminal comprising a first PoC Client according to claim 13, wherein said first PoC Client is further arranged to:
send an override message comprising said information to said at least one PoC Server if indicated by input from the user of said first PoC Client in the mobile terminal.

17. The mobile terminal comprising a first PoC Client according to claim 13, wherein said information comprises the identity of the first PoC Client and the identity of the at least one second PoC Client.

18. A method for providing Push to talk Over Cellular (PoC) communication services to a user of a first PoC Client participating in a first PoC Session of a PoC communication service in a communications system, comprising the steps of:
receiving inputs from a user of a first PoC Client indicating that the user of said first PoC Client wants to alert a user of a second PoC Client about relevant Media being shared in said PoC Session in which both of said first and second PoC Clients are participating, while said user of said second PoC Client is occupied in said at least second PoC Session; and, sending said input information to at least one PoC Server.

* * * * *

UNITED STATES PATENT AND TRADEMARK OFFICE
CERTIFICATE OF CORRECTION

| | | |
|---|---|---|
| PATENT NO. | : 8,412,253 B2 | Page 1 of 1 |
| APPLICATION NO. | : 12/936440 | |
| DATED | : April 2, 2013 | |
| INVENTOR(S) | : Holm et al. | |

It is certified that error appears in the above-identified patent and that said Letters Patent is hereby corrected as shown below:

On the Title Page, in the Figure, for Tag "S66", in Line 1, delete "an" and insert -- a --, therefor.

In the Drawings

In Fig. 6, Sheet 5 of 8, for Tag "S66", in Line 1, delete "an" and insert -- a --, therefor.

In the Specifications

In Column 10, Line 39, delete "Y 31" and insert -- Y 21 --, therefor at each occurrence throughout the specification.

In the Claims

In Column 14, Line 25, in Claim 1, delete "[PoC]" and insert -- (PoC) --, therefor.

In Column 14, Line 65, in Claim 4, delete "an" and insert -- a --, therefor.

In Column 15, Line 63, in Claim 9, delete "an" and insert -- a --, therefor.

In Column 16, Line 21, in Claim 12, delete "an" and insert -- a --, therefor.

In Column 16, Line 41, in Claim 14, delete "The comprising" and insert -- The mobile terminal comprising --, therefor.

Signed and Sealed this
Eleventh Day of June, 2013

Teresa Stanek Rea
*Acting Director of the United States Patent and Trademark Office*